United States Patent
Giroux et al.

(10) Patent No.: US 6,317,416 B1
(45) Date of Patent: Nov. 13, 2001

(54) FAIR QUEUE SERVICING USING DYNAMIC WEIGHTS (DWFQ)

(75) Inventors: Natalie Giroux, Hull; Raymond R. Liao, North York; Mustapha Aissaoui, Nepean, all of (CA)

(73) Assignee: Alcatel Canada Inc. (CA)

( * ) Notice: Subject to any disclaimer, the term of this patent is extended or adjusted under 35 U.S.C. 154(b) by 0 days.

(21) Appl. No.: 09/051,294

(22) PCT Filed: Oct. 11, 1996

(86) PCT No.: PCT/CA96/00681

§ 371 Date: Sep. 8, 1998

§ 102(e) Date: Sep. 8, 1998

(87) PCT Pub. No.: WO97/14240

PCT Pub. Date: Apr. 17, 1997

(30) Foreign Application Priority Data

Oct. 11, 1995 (GB) .................................................. 9520807

(51) Int. Cl.[7] ............................... H04J 3/14; H04L 12/56
(52) U.S. Cl. .............................................. 370/232; 370/412
(58) Field of Search .................................... 370/230, 232, 370/233, 234, 252, 253, 412–418, 468, 462, 463; 709/232

(56) References Cited

U.S. PATENT DOCUMENTS

| | | | |
|---|---|---|---|
| 5,179,557 | * | 1/1993 | Kudo .................................... 370/412 |
| 5,231,633 | * | 7/1993 | Hluchyj et al. ...................... 370/429 |
| 5,335,224 | * | 8/1994 | Cole et al. ........................... 370/235 |
| 5,432,790 | * | 7/1995 | Hluchyj et al. ...................... 370/412 |
| 5,463,620 | * | 10/1995 | Sriram ................................. 370/412 |
| 5,517,495 | * | 5/1996 | Lund et al. .......................... 370/399 |
| 5,623,668 | * | 4/1997 | Nieuwenhuizen ................... 709/100 |

OTHER PUBLICATIONS

Golestani; "A self–Clocked Fair Queueing Scheme for Broadband Applications"; IEEE 1994 pp. 636–646.

* cited by examiner

*Primary Examiner*—Min Jung
(74) *Attorney, Agent, or Firm*—Larson & Taylor, PLC

(57) ABSTRACT

In a method of fair queue servicing at a queuing point in a multi-service class packet switched network, incoming packets are received in buffers and outgoing packets are scheduled by a weighted fair queue scheduler. Real-time information of buffer usage along with the minimum bandwidth requirement is used to dynamically modify the weights of the weighted fair queue scheduler.

7 Claims, 3 Drawing Sheets

FAIR QUEUE SERVICING USING DYNAMIC WEIGHTS (DWFQ)

This invention relates to the field of telecommunications, and more particularly to a method of fair queue servicing in asynchronous data networks, such as Asynchronous Transfer Mode (ATM) networks or more generally any packet switched network that supports more than one class of service.

The use of ATM by a continually increasing number of applications is driving a requirement to increase the number of service classes and to allow more flexibility in the service offerings. To support the application requirements, the ATM Forum is adding new service categories in new releases of ATM specifications. Furthermore, network providers are looking for the flexibility of defining multiple service classes for a given service category. The service classes are differentiated by their Quality-Of-Service requirements (QoS). The QoS requirements are configurable in accordance with a bi-dimensional matrix describing loss and delay. The delay jitter is another factor which needs to be bounded for some service classes.

Previously, three service categories were supported on an ATM network element, namely constant bit rate (CBR), variable bit rate (VBR) and unspecified bit rate (UBR). The CBR service is the only service that guarantees a bound on delay. It is used for time sensitive data, such as voice and video.

These various services can be supported by traditional exhaustive round-robin queuing among two priority queues. However, this simple technique cannot be used when the number of queues increases beyond two, because of the high potential of starvation for lower priority queues. Furthermore, the exhaustive round robin can only guarantee bounds on delay and delay variation for the highest priority queue. The support of multiple service class in an ATM switching product or multiplexer requires a minimum of one queue per class.

A queue scheduling algorithm, Weighted Fair Queuing (WFQ), has been recently proposed in the literature (see S. Golestani, A self-clocked Fair Queuing scheme for broadband applications. INFOCOM 1994. June 1994).

This scheduling scheme allows any number queues (service classes) to be serviced, while providing fair and work conserving access to bandwidth. One of the key features of WFQ is that the CDV (Cell Delay Variation) is bounded for any service class, as long as it is given a minimum weight.

This proposed scheme can be implemented in ATM products, However, it has not been determined how to set the servicing weights efficiently to take into account the dynamically changing bandwidth requirement of each service class (connection addition/removal, ABR flow control, Early packet Discard).

An object of the invention is to provide a framework that ensures that the weights are set appropriately to guarantee the desired Quality of Service and modified in real-time to ensure that the dynamic allocation of bandwidth across the classes is optimized.

According to the present invention there is provided a method of fair queue servicing at a queuing point in a multi-service class packet switched network, wherein incoming packets are received in buffers and outgoing packets are scheduled by a weighted fair queue scheduler characterized in that real-time information of buffer usage along with the minimum bandwidth requirement is used to dynamically modify the weights of the weighted fair queue scheduler.

Preferably the minimum bandwidth requirement is extracted during connection admission control.

The method is particularly suitable for use in ATM networks.

The DWFQ (Dynamic Weighted Fair Queuing) can be implemented at any queuing point which arbitrates servicing between n queues ($n \geq 2$).

The invention also provides a fair queue servicing arrangement in a multi-service class packet switched network, comprising a weighted fair queuing controller, and buffer means for receiving incoming packets in queues, characterized in that further comprises means for monitoring buffer usage for each queue, means for determining the bandwidth requirements of each class of service, and a service weights manager for dynamically modifying the weights of said weighted fair queuing controller means in response to said buffer usage and bandwidth requirements.

Preferably, the means for monitoring buffer usage a queue growth monitor which performs real-time estimation of the queue growth in said buffer means.

The invention will now be described in more detail, by way of example only, with reference to the accompanying drawings, in which FIG. 1 is a diagram depicting the high level queuing scheme at an ATM switch ;

Figure 1:
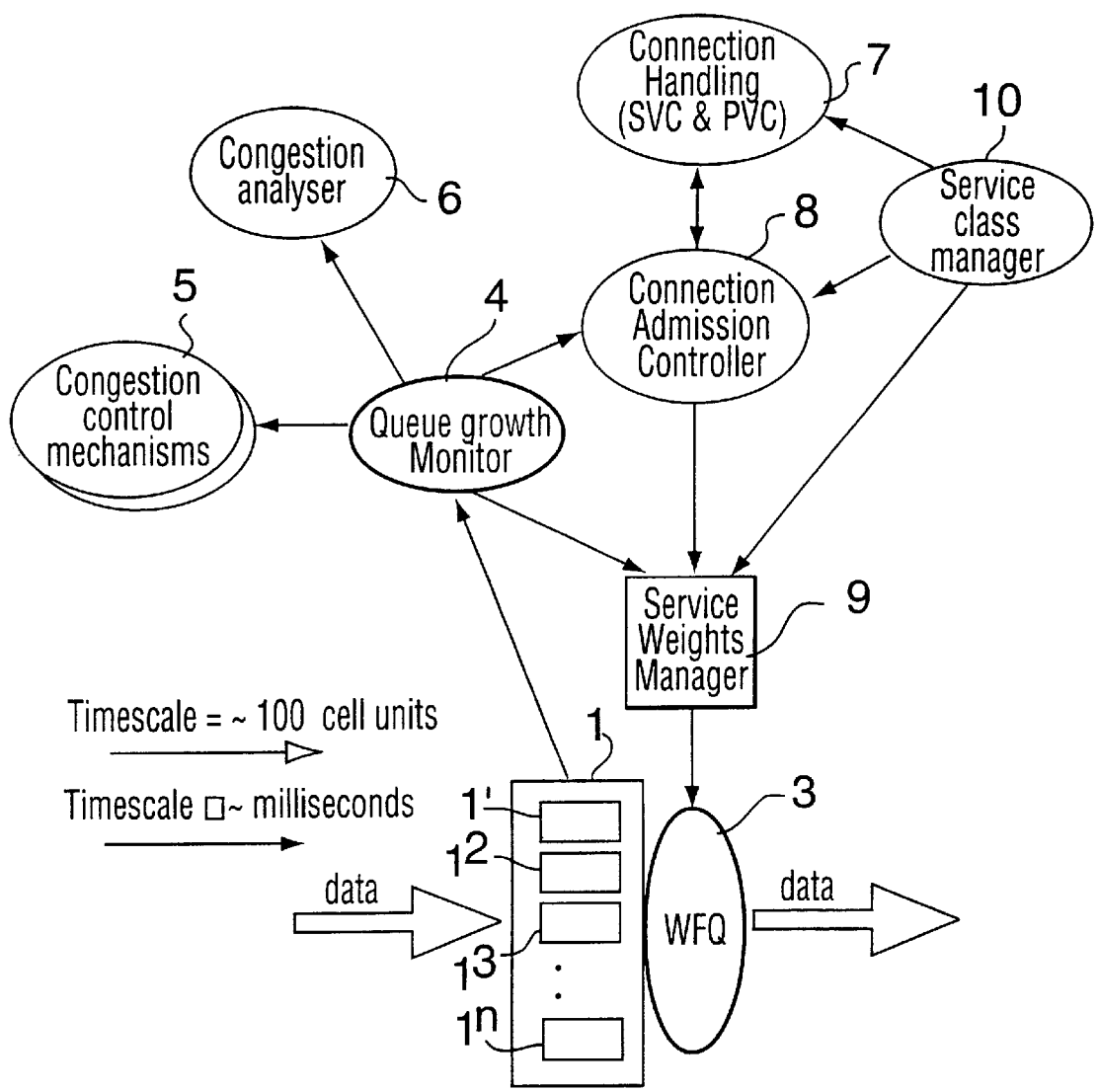

Referring now to FIG. 1, ATM cells 2 arrive at buffer 1 and are placed in queues $1^1, 1^2, \ldots 1^n$. From there the cells are passed to a weighted fair queuing unit 3. The buffer 1 is also connected to a queue growth monitor 4, which in turn is connected to congestion control unit 5, congestion analyzer 6, and connection admission controller 8, which in turn is connected to SVC & PVC (Switched Virtual Circuit and Permanent Virtual Circuit) connection handling unit 7, and service class manager 10. Queue growth monitor 4, connection admission controller 8 and service class manager 9 are connected to service weights manager 9, which is connected to weighted fair queuing scheduler 3.

The key element of the Dynamic Weighted Fair Queuing (DWFQ) scheme is the service weight manager (SWM) 9, which dynamically modifies the service weights to be used by the WFQ Scheduler 3. It uses real-time information from the service class manager 10, the connection admission controller 8, and the Queue growth monitor 4.

The service class manager 10 configures the service classes. A service class is configured with a given value of delay (CTD-Cell Transfer Delay) and loss (CLR-Cell Ratio Loss) requirements. These parameters represent the maximum nodal delay and loss allowed in order to meet the end-to-end QoS requirements of the connection. The service classes are mapped into a priority table as exemplified in Table 1. The priority table is used later by the service weight manager to allocate remaining bandwidth. The priority table is updated when a service class definition is modified. The service class manager also dictates which traffic descriptors are used to compute the minimum bandwidth required by a connection of a given class.

TABLE 1

Example of a Queue Service Priority Mapping.

|  | CTD | | |
| --- | --- | --- | --- |
| CLR | 100 μs | 500 μs | None |
| $10^{-9}$ | 1 | 3 | 6 |
| $10^{-7}$ | 2 | 5 | 8 |
| $10^{-5}$ | 4 | 7 | 9 |

The connection admission controller (CAC) 8 computes the minimum bandwidth required for each service class. The minimum bandwidth is updated each time a connection of a given class is established or disconnected, based on its traffic descriptor.

Table 2 shows a typical example of which traffic descriptors that can be used to compute the minimum bandwidth for each basic service category relative to the queue service rate (SR). The CAC 8 communicates the minimum Weight table to the SWM every time the value of the minimum weights have changed by a factor of ξ.

TABLE 2

Example of minimum weight table.

| $Queue_i$ | Category | min_Wi |
| --- | --- | --- |
| $Q_1$ | CBR | (Σ PCR)/SR |
| $Q_2$ | RT-VBR | (Σ SCR)/SR |
| $Q_3$ | NRT-VBR | (Σ SCR)/SR |
| $Q_4$ | UBR | 0 |

The CTD is further taken into account in the target queue size (TQS) table, which is the maximum queue size allowed to limit the CTD. An example of $TQS_i$ computation is shown in Table 3, for typical service categories. A zero TQS indicates that the queue can grow without limitation. This table is computed by the CAC.

TABLE 2

Example of a target queue size computation.

| $Queue_i$ | Category | TQSi |
| --- | --- | --- |
| $Q_1$ | CBR | CTD/min_Wi |
| $Q_2$ | RT-VBR | CTD/min_Wi |
| $Q_3$ | NRT-VBR | 0 |
| $Q_4$ | UBR | 0 |

The Queue Growth Monitor (QGM) 4 performs real-time estimation of the queue growth every $T_s$ cell slots (sampling interval). The information provided by the Queue Growth monitor 4 to the SWM 9 consists of ΔQi, the Queue Growth Rate of output queue i during an interval of duration Ts, Qi, the length of output queue i at the sampling time, and Ai, the arrival rate during the same interval of time.

The corresponding parameters: queue size Qi, queue growth ΔQi, number of arrivals Ai are collected or each queue by the QGM 4 for each Ts interval. From these parameters, auxiliary parameters such as average arrival rate λi and service rate μi can be derived by the SWM 9:

$\lambda_i$: average arrival rate, $\lambda_i = A_i \div T_s$ $\mu_i$: average service rate, $\mu_i = S_i \div T_s$, where $S_i = A_i - \Delta Q_i$ is the number of cells served during $T_s$.

Figure 2:
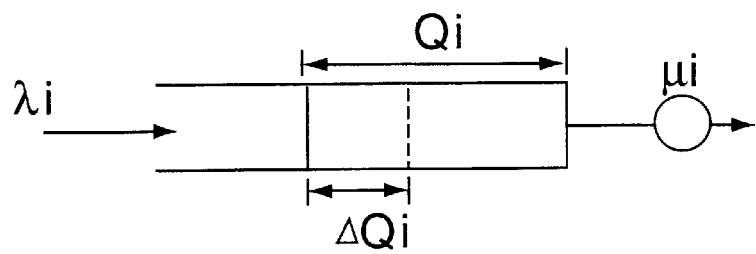
FIG. 2 shows the information provided by the Queue Growth Monitor.

FIG. 2 shows the information provided by the Queue Growth Monitor 4. Using this information for the CAC 8, the service class manager 9 and the queue growth monitor 4, the SWM computes the service eight for each queue i ($W_i$) to be used during the next sampling interval.

Figure 3:
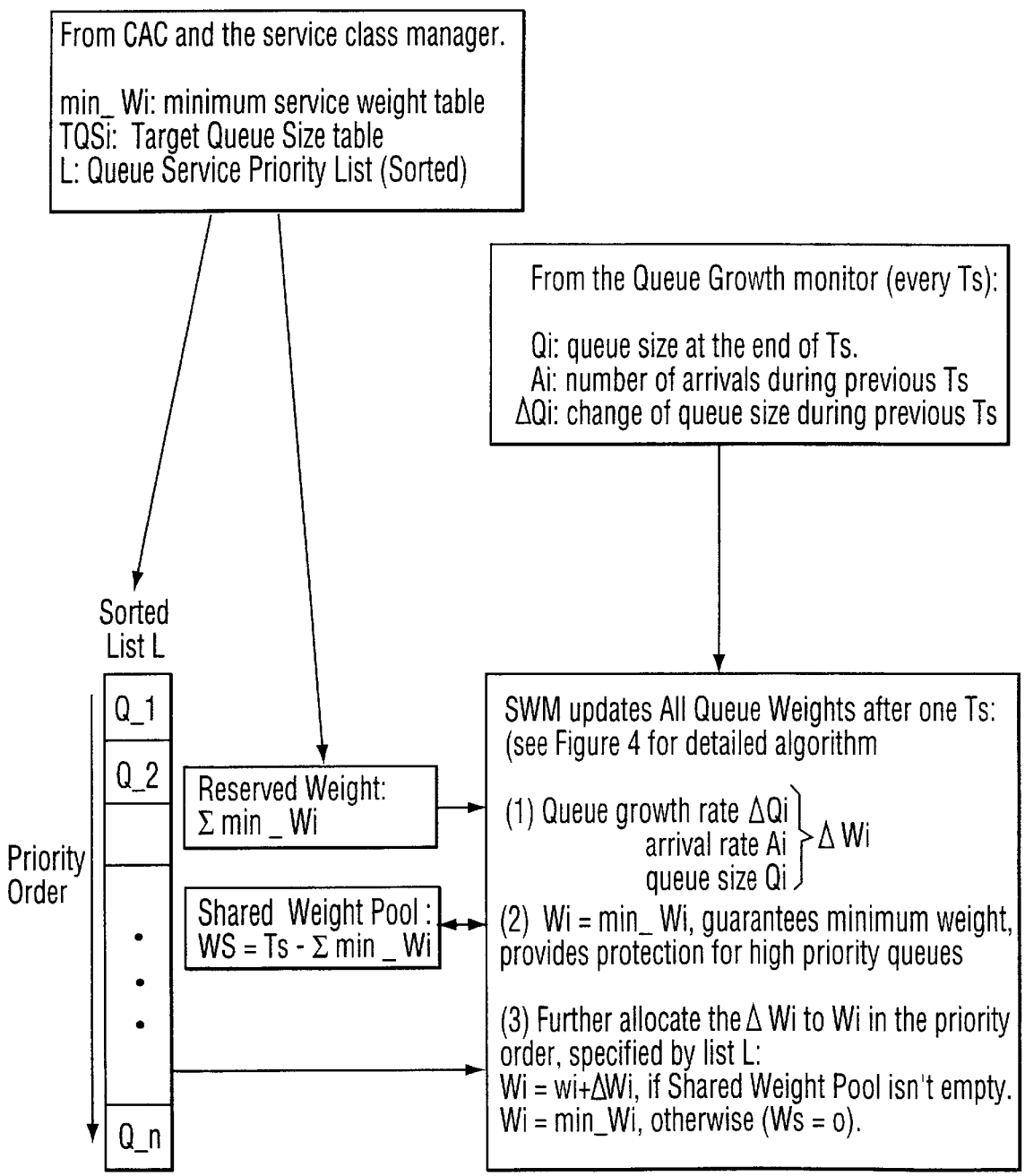
FIG. 3 illustrates the data flow between the key components of the system and the action of the Service Weight Manager (SWM)

As can be seen in FIG. 3 which shows the data flow between the key components of the system and the action of the SWM 9, the queue weights, Wi, are updated using information provided by the Queue Growth monitor 4.

If $\lambda_i$ denotes the arrival rate of cells in queue i in the coming $T_s$ interval, then ideally, the target service rate $\mu_i$ can be calculated as: $(\mu_i - \lambda_i) \cdot T_s = Q_i - TQS_i$. This means at the end of next Ts interval, the queue size Qi will reach the target queue size TQSi. On the assumption that $\lambda_i$ remains unchanged from $\lambda_i$, the service weight $W_i = \mu_i \cdot T_s$ can be approximated as $$W_i = \mu_i \cdot T_s \approx \lambda_i \cdot T_s + Q_i - TQS_i = A_i + Q_i - TQS_i.$$

However, the assumption on the stable arrival rate may not hold, and also the actual number of serviced cells Si could be less than Wi; therefore a more conservative approach is $\Delta Q_i > 0$, then $Q_i + \Delta Q_i$, the predicted queue size at the end of the next Ts interval, is used to calculate the target service rate and weight. That is:

$$(\mu_i - \lambda_i) \cdot T_s = Q_i + \Delta Q_i - TQS_i \text{ and } W_i \approx \lambda_i \cdot T_s + Q_i + \Delta Q_i - TQS_i = A_i + Q_i + \Delta Q_i - TQS_i$$

Figure 4:
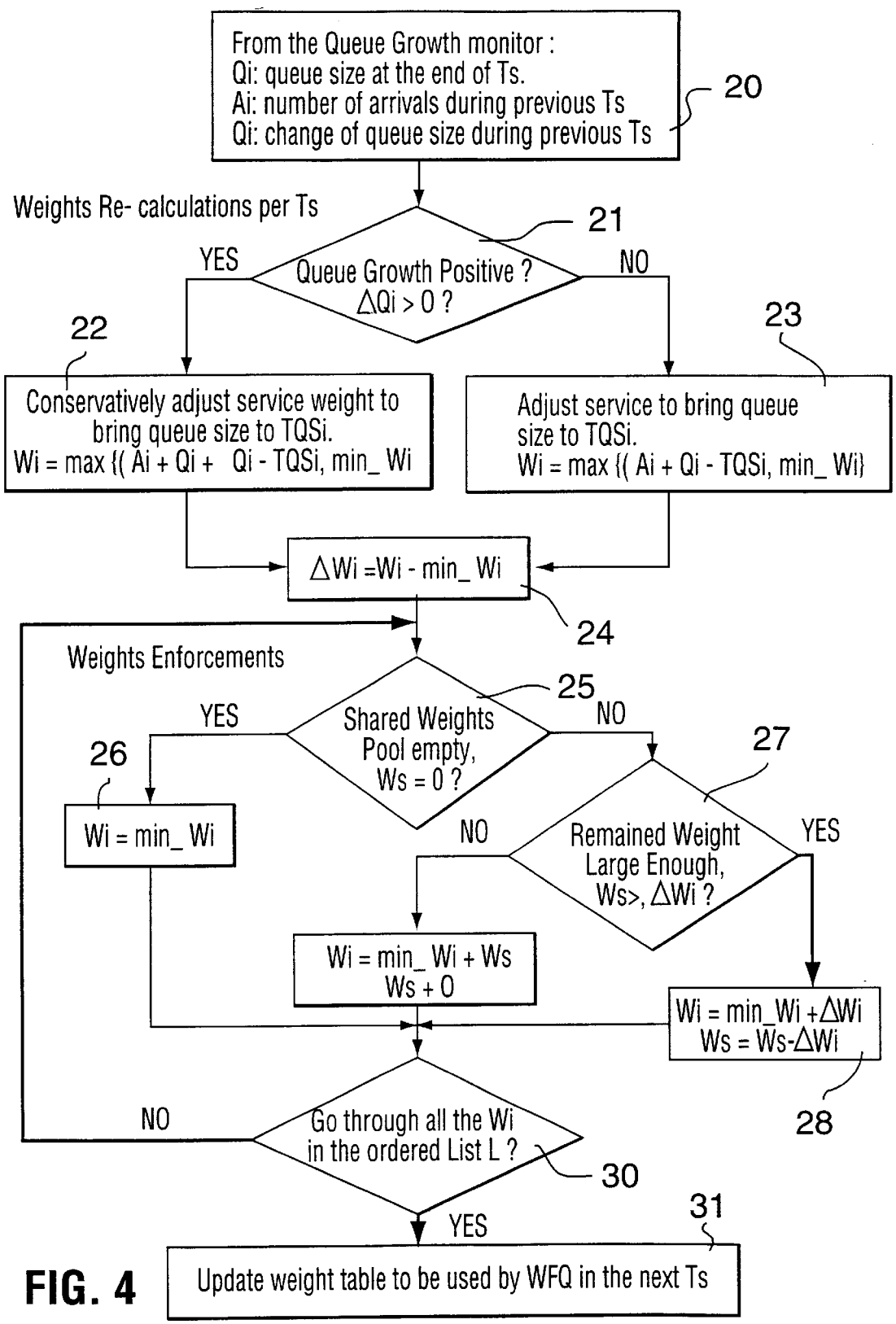
FIG. 4 describes the process performed by the SWM.

The detailed algorithm performed by the service weights manager 9 is shown in FIG. 4. The queue size $Q_i$ at the end of each interval $T_s$, the number of arrivals $A_i$ during the previous interval $T_s$, and the change in queue size $\Delta Q_i$ are input at step 20. Step 21 determines whether the queue growth is positive: if yes, the service weight $W_i$ is conservatively adjusted to bring the queue size to TQSi at step 22; if no, the service weight $W_i$ is adjusted to bring the queue size to TQSi at step 23. The difference ΔW is determined in step 24.

Step 25 determines whether the shared weights pool is empty: if yes, Wi is set to min_Wi in step 26; if no, step 27 determines whether $Ws \geq \Delta W_i$: if yes, step 28 sets $W_i = min\_W_i + \Delta W_i$ and $W_s = W_s + \Delta W_i$; if no, step 29 sets $W_i = min\_W_i + W_s$ and $W_s = 0$.

Step 30 runs through all the Wi in the ordered list L and step 31 updates the weight table used by the Weighted Fair Queuing scheduler 3.

The described technique complies with ITU and ATM forum standards and can be applied to an) switching equipment which supports more than a single service class of service.

What is claimed is:

1. A method of fair queue servicing at a queuing point in a multi-service class packet switched network, comprising the steps of:

enqueuing incoming packets in buffers associated with respective service classes;

transmitting outgoing packets from said buffers in accordance with a schedule determined by weights used by a weighted fair queue scheduler;

determining in real-time buffer usage and a minimum bandwidth requirement for each service class; and dynamically modifying the weights used by said weighted fair queue scheduler in real-time so as to cause buffer queue size to move toward a predetermined target value.

2. A method as claimed in claim 1, wherein the minimum bandwidth requirement for at least one service class is determined during connection admission control of a connection to said queuing point.

3. A method as claimed in claim 1, wherein said weights are also modified in accordance with real-time service class information.

4. A method as claimed in claim 1, wherein buffer usage is monitored by a queue growth monitor, said queue growth monitor performing real-time estimation of queue growth every sampling interval $T_s$.

5. A method as claimed in claim 1, wherein said packet switched network is an ATM network and said packets are ATM cells.

6. A method as claimed in claim 1, wherein the weights of the weighted fair queue scheduler are modified by carrying out the following steps during a series of sampling intervals:

a) determine whether the queue growth is positive, and if so adjust the weight to bring the queue size to said predetermined target value TQSi in accordance with the relationship $Wi=\max\{Ai+Qi+\Delta Qi-TQsi), \min\_Wi\}$, wherein Wi is the weight, Ai is the number of arrivals during a previous sampling period Ts, Qi is the queue size at the end of the sampling period Ts, $\Delta Qi$ is the change in queue size during the sampling period Ts, or else if the queue growth is not positive, adjusting the weight to bring the queue size to the predetermined target value TQSi in accordance with the relationship $Wi=\max\{Ai+Qi-TQsi), \min\_Wi\}$; and b) determining the difference $\Delta Wi=Wi-\min\_Wi$, where Wi is determined in step a).

7. A method as claimed in claim 1, wherein cell transfer delay cell loss ratio requirements for each class of service are stored and taken into account in dynamically modifying the weights of said weighted fair queue scheduler.

* * * * *